United States Patent [19]

Delaney et al.

[11] 3,735,354

[45] May 22, 1973

[54] MULTIPLEXED MEMORY REQUEST INTERFACE

[75] Inventors: Lyle F. Delaney, Coon Rapids; Leon A. Mager, St. Paul, both of Minn.

[73] Assignee: Sperry Rand Corporation, New York, N.Y.

[22] Filed: Apr. 7, 1972

[21] Appl. No.: 242,030

[52] U.S. Cl. .......... 340/172.5

[51] Int. Cl. .......... G06f 9/00

[58] Field of Search .......... 340/172.5

[56] References Cited

UNITED STATES PATENTS

| | | | |
|---|---|---|---|
| 3,354,430 | 11/1967 | Zeitler et al. | 340/172.5 |
| 3,254,329 | 5/1966 | Lukoff et al. | 340/172.5 |
| 3,374,471 | 3/1968 | Smith | 340/172.5 |
| 3,566,366 | 2/1971 | Quinn et al. | 340/172.5 |
| 3,551,895 | 12/1970 | Driscoll | 340/172.5 |
| 3,573,854 | 12/1968 | Watson et al. | 340/172.5 |
| 3,237,169 | 2/1966 | Hartwig et al. | 340/172.5 |

*Primary Examiner*—Paul J. Henon
*Assistant Examiner*—Mark Edward Nusbaum
*Attorney*—Thomas J. Nikolai, Donald W. Phillion, Kenneth T. Grace et al.

[57] ABSTRACT

A multiplexed memory request interface capable of staging one memory access request while an immediately previously received memory access address request is being received and processed in the memory, and employing a common memory access path and other common circuitry for both address requests.

8 Claims, 9 Drawing Figures

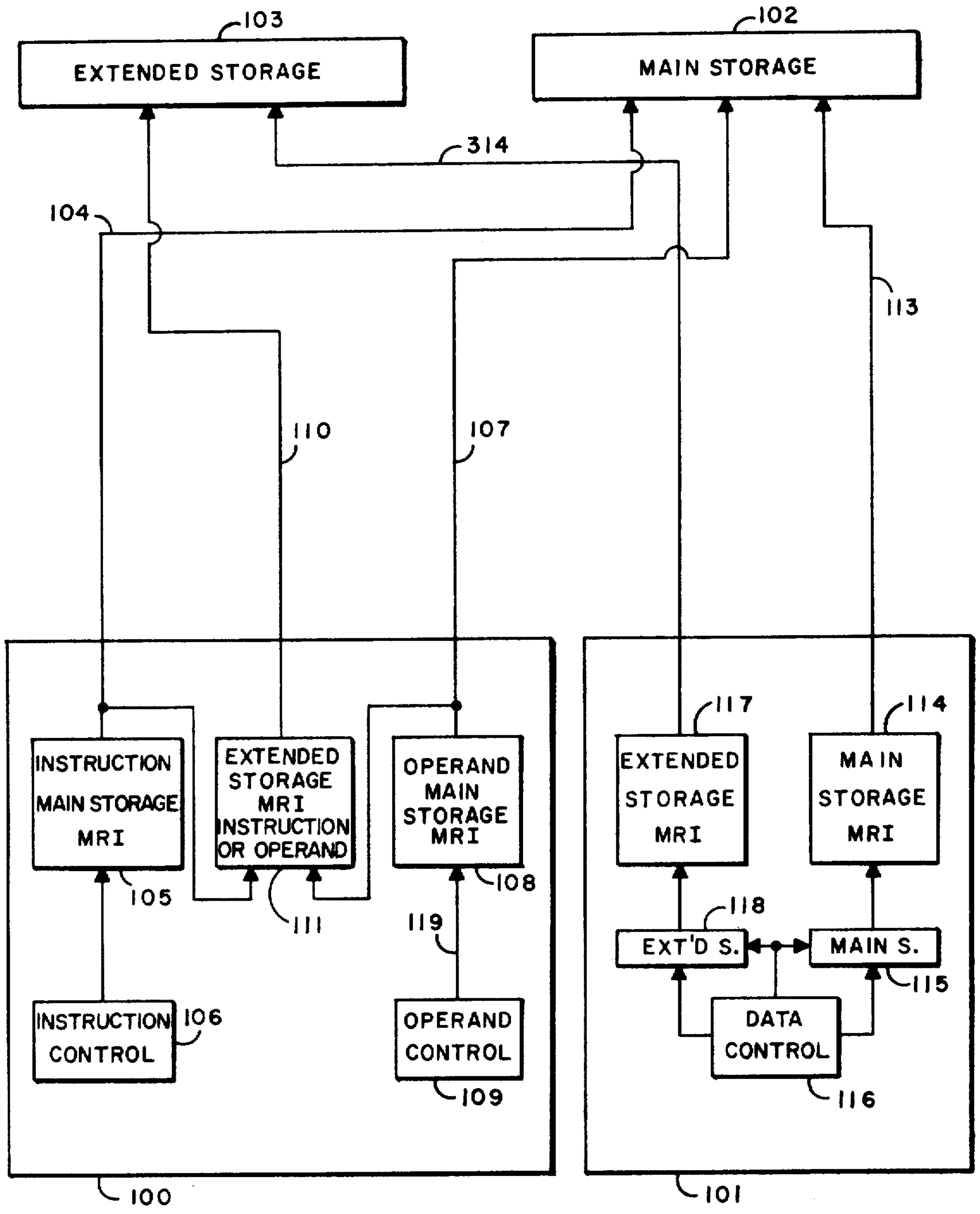
FIG I

MULTIPLEXED MEMORY REQUEST INTERFACE

SUMMARY OF THE INVENTION

This invention relates generally to a multiplexed memory request interface in a data processor and more specifically to a memory request interface (MRI) logic means for staging, i.e., temporarily holding, a given address request for memory access while an immediately previously received address request is being received and processed in the memory (usually main storage), and employing a common memory access path and other common circuitry for both address requests.

Many prior art data processors employ a destructive readout (DRO) memory which requires a memory restore cycle after each read operation. The staging of the next succeeding address request can occur during the rewrite of the data back into the memory after the read operation. An example of such an arrangement is disclosed in the Hartwig et al. U.S. Pat. No. 3,237,169. By utilizing the rewrite time to stage the next address request, in a destructive readout type memory, the average memory access time can be minimized. However, in the case of a nondestructive readout type memory there is no rewrite time interval during which the next address request can be staged in preparation for the next memory access. Accordingly, in many processor systems the processing of the next address request must wait until the processing of the current address request is completed. Such a procedure is time consuming and decreases the operating speed of the processor.

It is a primary object of the invention to provide logic means for staging a given address request while the immediately preceding address request is being received and processed in the memory.

Another purpose of the invention is to stage a given address request while the immediately preceding address request is being serviced in memory and in which both address requests use common logic.

A third aim of the invention is to decrease the average memory access time of a data processor.

BRIEF DESCRIPTION OF THE DRAWINGS

The abovementioned and other objects and features of the invention will be more fully understood from the following detailed description thereof when read in conjunction with the drawings in which:

FIG. 1 is a simplified block diagram showing processor to storage interface paths;

Figure 4:
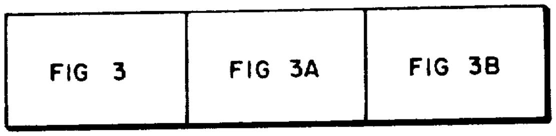
FIG. 4 is a sketch showing how FIGS. 3, 3*a* and 3*b* fit together.
Figure 6:
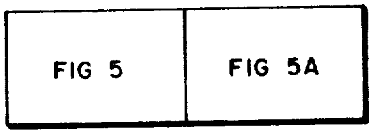
FIG. 6 shows how FIGS. 5 and 5*a* fit together.

This specification will be organized in accordance with the following outline.

I. GENERAL OVERVIEW OF INVENTION
II. DETAILED DISCUSSION OF OPERATION
  A. INITIATION OF OPERATION
  B. THE FIRST CYCLE OF OPERATION AFTER THE INITIAL CYCLE
  C. OPERATION OF CIRCUIT IN EXTENDED CYCLE MODE

I. GENERAL OVERVIEW OF INVENTION

Referring now to FIG. 1 there is shown a generalized block diagram of the interface paths between the processor and storage. Only the command arithmetic unit (CAU) 100 and the input/output arithmetic unit (IOAU) 101 portions of the processor are represented in FIG. 1. Within each of the blocks 100 and 101 there is broadly shown the logic required to interface CAU 100 and IOAU 101 with main storage section 102 and extended storage section 103.

More specifically, in CAU 100 there are shown two access paths 104 and 107 to main storage 102, one path 104 for instructions and the other path 107 for operands. The path 104 for instructions utilizes the instruction main storage Memory Request Interface (MRI) 105 and the instruction control logic 106. The operand access path 107 to main storage employs the operand main storage 108 and the operand control 109. Extended storage logic 103 is reached via lead 110 from CAU 100 under control of the Extended Storage (MRI) logic 111.

In IOAU unit 101 there is shown a single path 113 to main storage 102, which path utilizes the logic represented by blocks 114, 115 and 116 all of which are more particularly described hereinbelow. There is also shown a single path 314 from the IOAU unit 101 to extended storage 103, which path utilizes the logic circuit represented by blocks 117, 118 and 116 in IOAU 101.

In the general logic diagram of FIG. 1, the memory request interfaces (MRI's) are identified as logic blocks 105, 108, 117 and 114. MRI's 105 and 108 of CAU 100 operate in a manner very similar to that of the MRI's 117 and 114 of IOAU 101. In fact, the operation of the memory request MRI's 105, 108, 117 and 114 are so similar to one another that only one of said MRI's (MRI 108) will be described herein with the aid of detail in FIGS. **3, 3*a* and 3*b*.**

The operand MRI 108 of FIG. 1 interfaces with the operand control logic 109 via a plurality of signal lines, as for example, 80 lines in cable 119. These 80 lines typically can consist of 24 bits of storage address plus 2 address parity bits, 36 write data bits plus 2 write data parity bits, 8 write control bits with 1 parity bit, 1 test and set or clear bit, and six control lines for controlling transfer of information from operand control 109 to the operand MRI 108. The address bits, write data bits, write control bits, the test and set or clear bits, and their associated parity bits are gated into one of two MRI matrices (register buffers) located in the operand MRI, as shown in detail in FIGS. **3, 3*a* and 3*b*,** and as will be discussed later herein.

Figure 2:
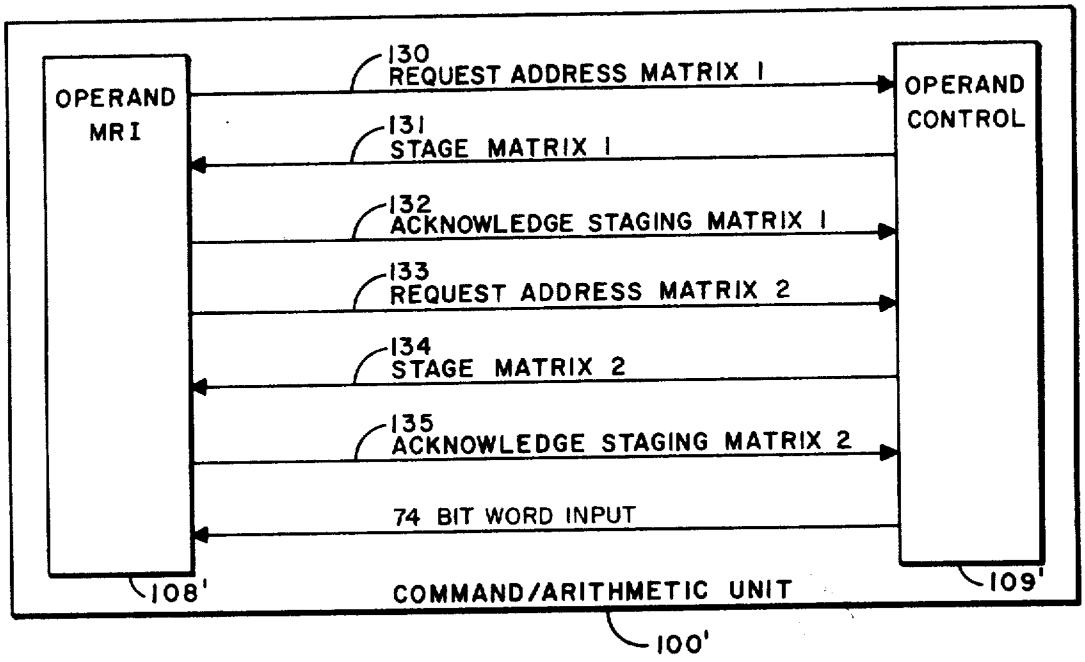
FIG. 2 shows six control lines existing between two of the logic blocks of FIG. 1 for controlling the staging of the address requests to main storage.

Referring now to FIG. 2 there are shown the six signal lines that control the staging of the two operand MRI matrices. These signal lines are identified by reference characters 130 – 135 and have arrows therein indicating signal direction. The six signals on the six signal lines occur in cyclical sequence in the order of their reference numbers, and are briefly defined in the following sequence of steps:

1. REQUEST ADDRESS MATRIX 1 (line 130)—A control signal on this line informs the operand control 109' that the operand MRI matrix 1 (i.e. the register buffer therein) can accept memory request information such as address, write data, write control, and test set or clear signals.

2. STAGE MATRIX 1 (line 131)—A signal from operand control 109' on this line directs the operand MRI 108' to enter into matrix 1 the memory request information on the 74 interface lines and then to generate a memory request to storage utilizing that information. The stage matrix 1 signal never activated unless the request address matrix 1 control signal of step 1 above is also active.
3. ACKNOWLEDGE STAGE MATRIX 1—A signal on line 132 flows from the operand MRI 108' to operand control 109' serves to inform operand control 109' that matrix 1 has temporarily stored the information received on the 74 line interface.
4. REQUEST ADDRESS MATRIX 2—A signal on line 133 informs operand control 109' that the buffer storage matrix 2 in operand MRI 108' can accept memory request information.
5. STAGE MATRIX 2—A control signal on line 134 flows from operand control 109' and directs operand MRI 108' to temporarily stored in matrix 2 the memory request information on the 74 line interface and to generate a memory request to storage utilizing that information. The stage matrix 2 signal is not activated unless a request address matrix 2 is also active.
6. ACKNOWLEDGE STAGE MATRIX 2—A control signal on line 135 flows from operand MRI 108' and serves to inform the operand control 109' that matrix 2 has stored the information appearing on the 74 line interface.

The operand MRI 108' functions to interface the memory request rates of the operand control with variable cycle times and with the availability of storage. The operand MRI 108' is passive and asynchronous in nature, and does not react unless stimulated by some external signal, as will be more fully understood from the detailed description of the logic diagram of FIGS. 3, **3*a* and 3*b*. The general sequence of events for the operand MRI 108' when responding to the series of requests from operand control 109', as listed above, will be discussed with the aid of the logic diagrams of FIGS. 3, 3*a* and 3*b* and the timing chart of FIG. 5**.

Figure 3:
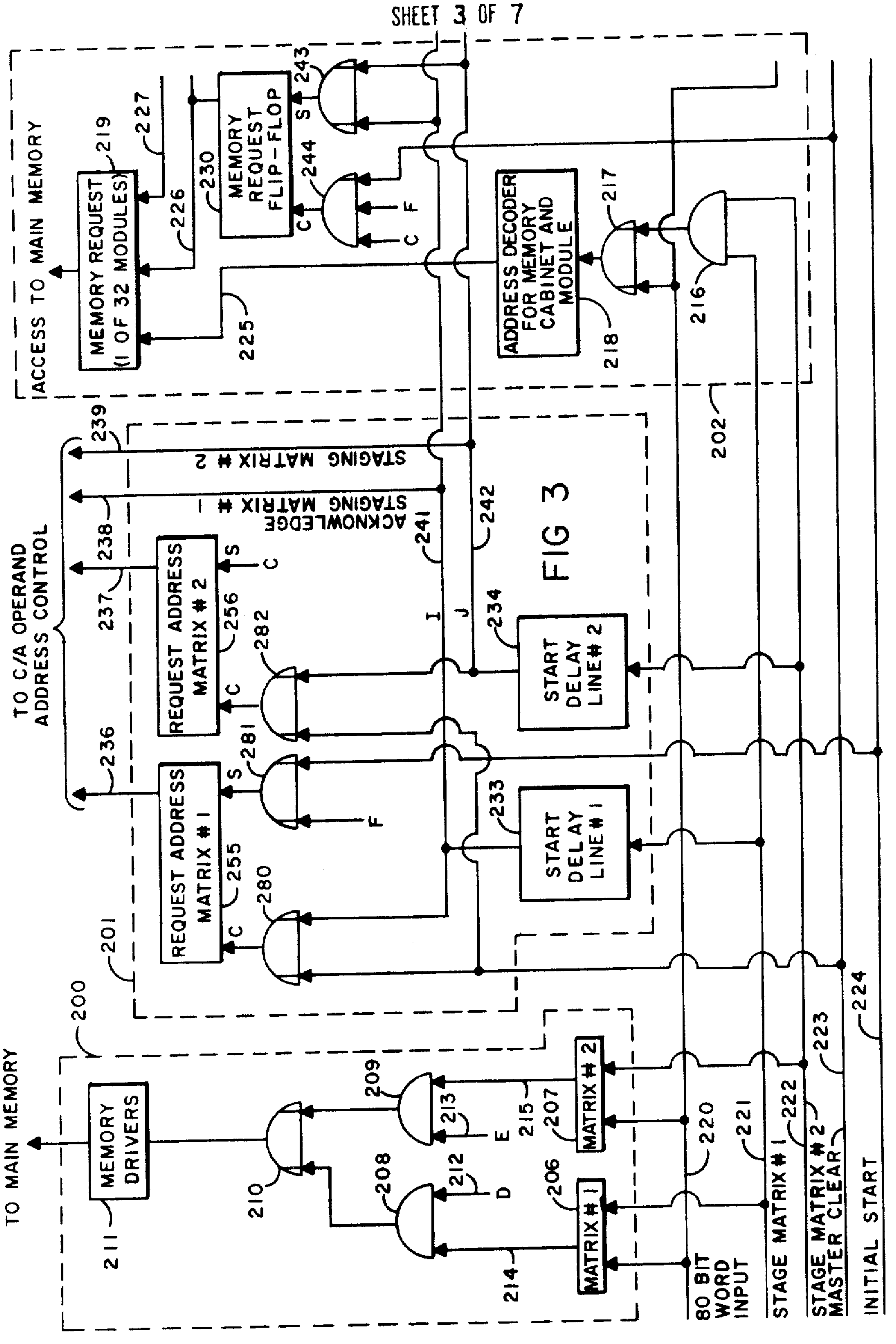
FIGS. 3, 3*a* and 3*b* show the logic diagram of the implementation of the memory request interface (MRI)

In FIG. 3 the logic is divided into three separate areas, each enclosed in a dotted rectangular box, and identified by reference characters 200, 201 and 202.

The logic contained within dotted blocks 200, 201 and 202 respectively comprise the means for sequencing the matrices, requesting and acknowledging address requests from operand control, and for accessing memory.

The logic in FIG. **3*a* is primarily control logic for controlling the logic of FIG. 3** during standard (non-extended) cycles of operation.

Figure 3A:
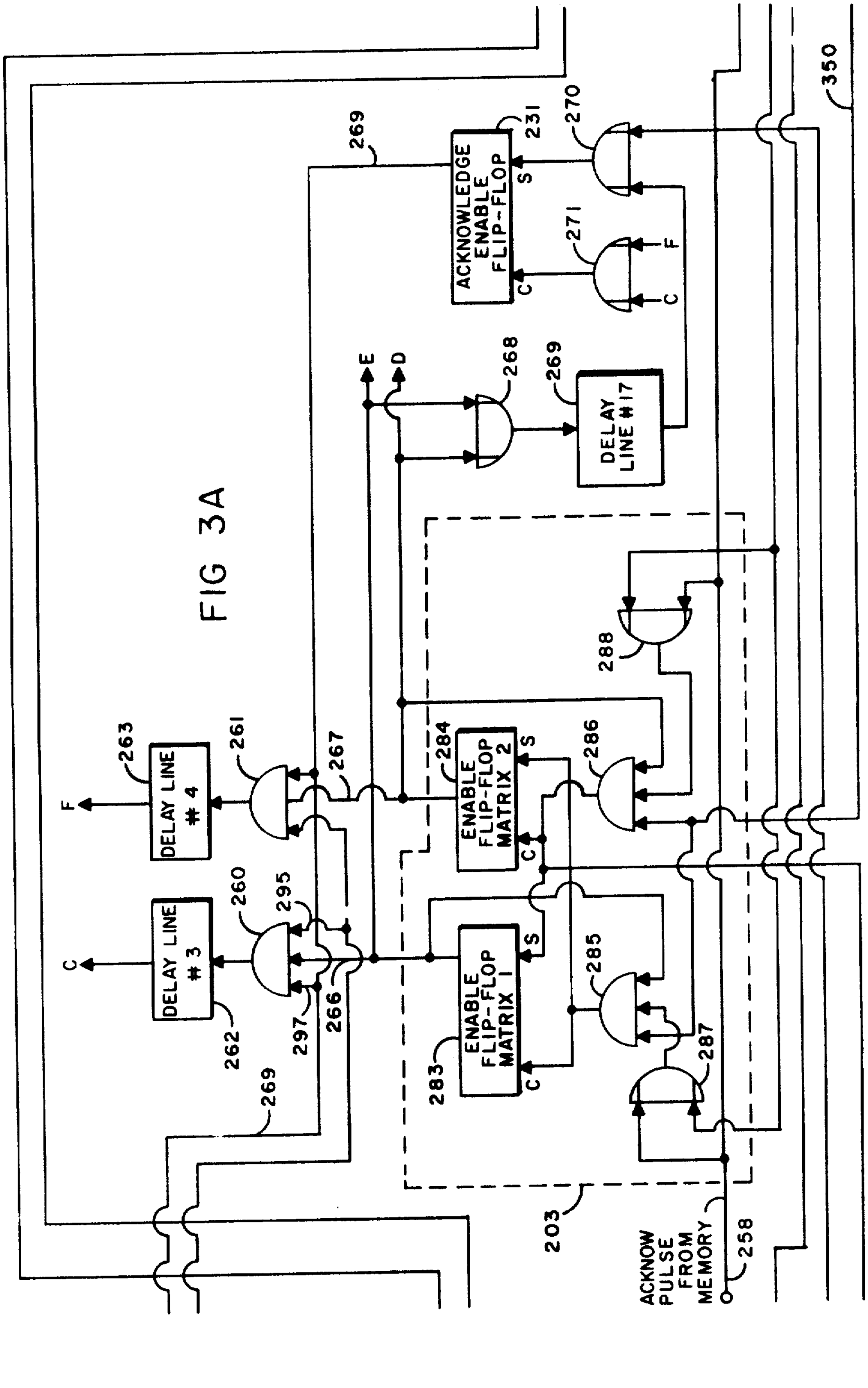

The circuits represented in FIG. **3*b*** are control circuits which become activated to control the structure depicted in FIG. 3 and FIG. 3*a* when the extended cycle mode of operation is in effect.

The various portions of the logic will be discussed in more detail in the following paragraphs.

Within the dotted rectangular block 200 is shown the matrices 206 and 207 to which the 74-bit word address requests received from the operand address control (block 109' of FIG. 2) are alternately supplied, under control of the control logic shown in FIG. 3*a*.

More specifically, AND gates 208 and 209 in the dotted block 200 of FIG. 3 are alternately conditioned to pass the contents of the matrices 206 and 207 through OR gate 210, and then through memory drivers 211 to the main memory.

The selection of the particular memory cabinet and module being accessed is determined by the logic within the dotted rectangle 202. More specifically, the 74-bit word input received from the operand address control on leads 220 is also supplied through OR gate 217 and into address decoder 218, the output of which is then supplied to memory request AND gate 219 through a plurality of leads represented by the cable 225. The other two inputs 226 and 227 to AND gate 219 must be at a high level (representing a binary 1) in order for AND gate 219 to be fully enabled to complete the access to main memory, whereby the output of memory drivers 211 will be gated to main memory in preparation for the read or the write operation.

To place the said two other inputs 226 and 227 at a high level, the memory request flip-flop 230 must be set and the acknowledge enable flip-flop 231 of FIG. 3*a* must also be set.

The memory request flip-flop 230 is set by a signal at the output of either the start delay line 233 or the start delay line 234 within the block 201 of FIG. 3. It is to be noted that the output of delay lines 233 or 234 also functions, via lead 238 or 239, to perform the staging of one of the matrices 206 or 207 after the requested address request has been received.

To place input lead 227 at a high level the acknowledge enable flip-flop 231 of FIG. 3*a* must be set. The setting of acknowledge enable flip-flop 231 occurs as a result of an acknowledge signal received back from the main memory after an access has been made thereto from the output of memory request AND gate 219 (FIG. 3). Thus, the acknowledge signal required to energize the flip-flop 231, and subsequently the memory request AND gate 219, is always a result of the immediately previous access to main memory, i.e., the previous energization of memory request AND gate 219. It can be seen that the input lead 227 to the memory request AND gate 219 must initially be set to a high value when the operation of the system is initiated. Accordingly, the acknowledge enable flip-flop 231 of FIG. 3a is initially set by a master clear signal inputted on lead 223 which passes through OR gate 270 to set flip-flop 231.

Referring again to dotted block 201 in FIG. 3, the requesting of addresses is effected by signals appearing on output leads 236 or 237 as a result of the setting of flip-flop 255 or 256, which are set alternately in response to successive cycles of operation. The two flip-flops 255 and 256 within dotted block 201 are set by signals on input leads F and C, respectively, to produce the address request signals on the output leads 236 and 237. The signals supplied to input leads F and C are generated within the control logic of FIG. 3*a*.

One of the main functions of the control logic of FIG. 3*a* is to receive the acknowledge pulse resulting from an immediately previous access to main memory to prepare the logic circuits of FIGS. 3, **3*a* and 3*b*** for the next access to main memory.

More specifically, the control circuit of FIG. 3*a* responds to each acknowledge pulse received from main memory to change the mutually exclusive states of AND gates 208 and 209 of FIG. 3 so that the outputs of matrices 206 and 207 are alternately supplied to main memory, and also to change the mutually exclusive states of flip-flops 255 and 256 so that the request address sent to the MRI will be for the alternate matrix of the matrix staged previously.

The control circuit logic within the dotted block 203 of FIG. 3*a* comprises a toggle switch which responds to the acknowledge signal received on input lead 258 from main memory to change states with each such received acknowledgement signal.

The changing of states of the toggle switch 203 results in the changing of state of the output leads 266 and 267, one of said output leads being at a high level and the other at a low level. Since output leads 266 and 267 are connected directly to terminals D and E of FIG. 3 it can be seen that the conditions of AND gates 208 and 209 are changed each time an acknowledgement signal is received by the toggle switch 203 of FIG. 3*a*. Furthermore, since both of the output leads 266 and 267 are connected via OR gate 268 to delay line 269, and then through OR gate 270 to the set input of acknowledge enable flip-flop 231, it can be seen that said flip-flop 231 is always set as a result of the receipt of an acknowledgement signal, but only after the delay period established by delay line 269.

Depending upon whether lead 266 or 267 is high, either AND gate 260 or AND gate 261 will ultimately become conductive to energize either delay line 262 or 263, thereby producing output signals on output leads C or F. The output terminals C and F are each connected with three other points in the logic diagrams of FIGS. 3, 3*a* and 3*b*. One such connection is to the set side of the request address flip-flops 255 and 256 as shown within the dotted block 201 of FIG. 3. A signal on either output terminal C or F will function to set either the request address flip-flop 255 or the flip-flop 256 to request the address for either matrix 206 or 207.

The output from either terminals C or F will also function to clear memory request flip-flop 230 through OR gate 244 in FIG. 3, and to clear the acknowledge enable flip-flop 231 of FIG. 3a through OR gate 271, thus completing the preparation of the entire logic circuit for the next access to main memory.

It is to be noted specifically, that during the time interval that the acknowledge enable flip-flop 231 was set, the memory request flip-flop 219 of FIG. 3 was enabled to perform an access to main memory. During such time interval the other two input leads 226 and 225 to the memory request AND gate 219 were in fact also at a high level, as will be seen from the detailed description of the timing chart of FIG. 5 which will be discussed later herein.

II. DETAILED DISCUSSION OF OPERATION

A. INITIATION OF OPERATION

In order to begin the operation of the invention it is first necessary to preset the various flip-flops to certain conditions. Such presetting of the flip-flops is accomplished by the use of a master clear pulse supplied to the input lead 223 in FIG. 3, and an initial start pulse supplied to input lead 224 of FIG. 3.

The master clear pulse functions to clear the request address flip-flops 255 and 256 through OR gates 280 and 282 in FIG. 3, and also to set the acknowledge enable flip-flop 231 through OR gate 270 in FIG. 3*a*.

Subsequently, the initial start pulse supplied to input lead 224 functions to set the request address flip-flop 255 of FIG. 3 through OR gate 281 and in FIG. 3*a* to set flip-flop 283 and reset flip-flop 284 in the toggle switch 203.

The setting of the request address flip-flop 255 in FIG. 3 initiates the request for the first address from the operand control 109' of FIG. 2 via lead 236 of FIG. 3. The operand control 109' responds to such request to supply the first 74-bit word back to the logic of FIG. 3, 3*a* and 3*b* via input lead 220. This first 74-bit word is staged (temporarily stored) in matrix 1 of FIG. 3. The start delay line 233 responds to the receipt of the staging signal to perform two functions. The first of these two functions is to clear the request address flip-flop 255 through OR gate 280 which supplies an acknowledgement of the staging of matrix 1 to the operand control via lead 238 of FIG. 3.

Upon receipt of the aforementioned acknowledge signal, the operand control becomes prepared to supply a second 74-bit word to the MRI upon the receipt of the next address request, which will be for matrix 2.

Figure 5:
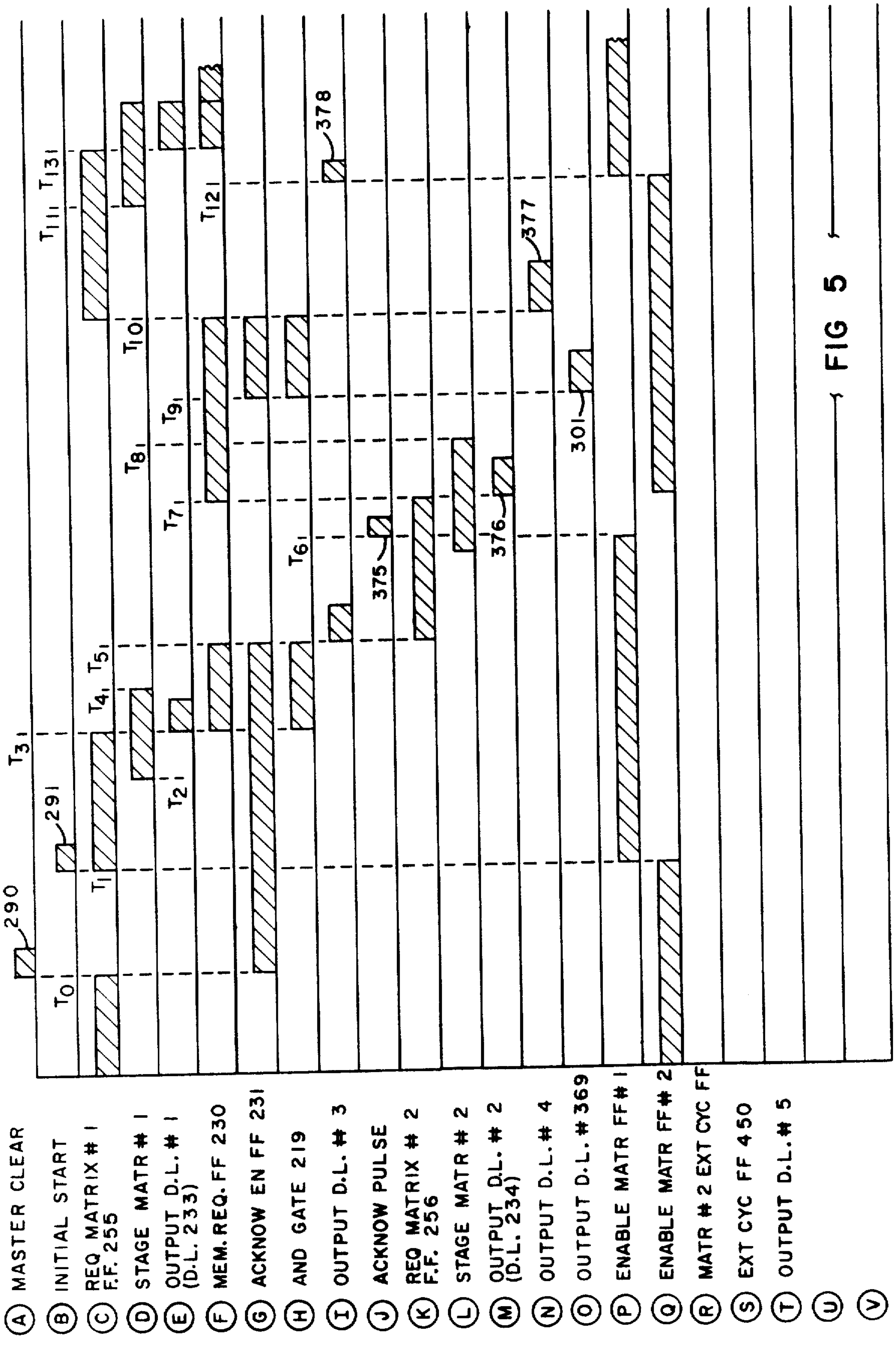
FIGS. 5 and 5*a* form a timing diagram of the operation of the logic of FIGS. 3, 3*a* and 3*b*.

Referring to the timing chart of FIG. 5 the clear pulse is shown in the waveform A thereof and designated by reference character 290 which occurs at time $T_0$. The initial start pulse follows the master clear pulse by some time duration and is shown as pulse 291 in waveform B. It can be seen that the master clear pulse 290 functions to clear the request matrix flip-flop 1 as shown in waveform C.

It is to be understood that in all of the diagrams of FIG. 5 a cleared condition of a flip-flop is represented by the lower level of the waveform and a set condition of the flip-flop by a higher level of the waveform.

The master clear pulse 290 can also be seen to set the acknowledge enable flip-flop 231 as shown in waveform G.

The initial start pulse 291 can be seen to set the request matrix flip-flop 1 at time $T_1$ as shown in waveform C, and also to set the enable matrix flip-flop 283 (FIG. 3*a*) at time $T_1$ as shown in waveform P.

The setting of the request matrix flip-flop 255 at time $T_1$ sends a command to the operand control to send the first 74-bit word to matrix 1. Accordingly, a short time later at time $T_2$, the 74-bit word arrives from the operand control and is staged in matrix 1 as shown in waveform D. Included in the 74-bit word received from operand control is the "stage matrix" control signal which is received on input 221 of FIG. 3. The start delay line 233 responds to the stage matrix 1 signal to clear the request address flip-flop 255 through OR gate 280 at time $T_3$ as shown in waveform C, which indicates to the operand control that the 74-bit word has been stored in matrix 1.

The output of start delay line 233 is also supplied via lead 241 through OR gate 243 to set memory request flip-flop 230, as shown at time $T_3$ in waveform F of FIG. 5.

Thus, at time $T_5$ both the memory request flip-flop 230 and the acknowledge enable flip-flop 231 are set (See waveform F and G). The memory request AND gate 219 of FIG. 3 will now pass an output from address decoder 218, to select the particular memory cabinet and module called for by the first 74-bit word staged in matrix 1, to access the main memory, as shown at time $T_3$ in waveform H of FIG. 5. It occurs however, substantially simultaneously with the staging of matrix 1 at time $T_2$.

To summarize, the memory request flip-flop 219 is enabled to pass the decoded signal from address decoder 218 to the main memory and effect an access to main memory. Thus the data contained in matrix 1 is passed through AND gate 208, OR gate 210 and the memory drivers 211 into main memory where the read or write operation required is done.

It is to be noted that the input 212 of AND gate 208 is at a high level at this time since it is connected to the set output of the enable matrix flip-flop 283 of FIG. 3*a*, which is in a set condition by virtue of the initial start pulse 291 (waveform B).

As soon as the memory request flip-flop 230 is energized, as shown at time $T_3$ in waveform F, the necessary conditions for the energization of AND gate 260 of FIG. 3*a* are met and the delay line 262 is energized. More specifically, the conditions for the enabling of AND gate 260 are as follows: the setting of memory request flip-flop 230 produces a high level signal on input 295 of AND gate 260; the input 296 is at a high level since the flip-flop 283 is set; and the input 297 is at a high level since the acknowledge enable flip-flop 231 is in a set condition.

The delay time of delay line 262 is equal to the interval between times $T_3$ and $T_4$ in FIG. 5. At time $T_4$ the delay line 262 produces an output on its output lead C which, as discussed briefly hereinbefore, is supplied to three input leads in the logic circuit of FIGS. 3, 3*a* and 3*b*. These three input terminals are as follows:

1. to an input of OR gate 271 and then to the clear input of acknowledge enable flip-flop 231 to thereby clear said flip-flop 231;
2. to the set side of request address flip-flop 256 in FIG. 3, to thereby set flip-flop 256 and initiate the request for the next 74-bit word from the operand control unit 109' of FIG. 2;
3. to an input of OR gate 244 and then to the clear input of memory request flip-flop 230, thereby clearing flip-flop 230.

The clearing of memory request flip-flop 230 in turn functions to disable the AND gate 260 in FIG. 3*a* by lowering the input signal on input terminal 295 thereof. It is to be noted that AND gate 261 would also be disabled if it had been in an enabled condition (which it was not). It is important that AND gate 261 be disabled so that it does not pass a pulse to the delay line 263 prematurely upon the receipt of an acknowledge signal upon input lead 258. In other words, AND gate 261 should not be enabled until three conditions are met, one of which includes the setting of the memory request flip-flop circuit 230 of FIG. 3.

The initial cycle of operation is now completed. The second cycle of operation will now be discussed below.

B. THE FIRST CYCLE OF OPERATION AFTER THE INITIAL CYCLE

Returning again to the timing chart of FIG. 5 the first acknowledge pulse is received back from memory at time $T_6$ as shown in waveform J. This acknowledge signal 375 is received on input terminal 258 of FIG. 3*a* and is supplied through the OR gates 287 and 288 to the AND gates 285 and 286, respectively, to thereby reverse the conditions of each of the flip-flops 283 and 284. As a result thereof the flip-flop 283 is cleared, as shown in the waveform P of FIG. 5, and the flip-flop 284 is set, as shown in waveform Q of FIG. 5. The AND gate 261 will not become enabled at this time since the memory request flip-flop 230 is not yet set, as shown at time $T_7$ in waveform F of FIG. 5.

It will be recalled that the address request matrix flip-flop 256 in FIG. 3*a* was set at time $T_5$ (waveform K) and that the matrix 2 was loaded at time $T_5$ shortly thereafter and before time $T_6$ as shown in waveform L. Subsequently, at time $T_7$ (waveform M) an output pulse 376 was generated at the output of start delay line 234, which output pulse was supplied via OR gate 243 to set the memory request flip-flop 230, as shown at time $T_7$ in waveform F.

As discussed hereinafter, in order to energize memory request AND gate 219 it is necessary to also have the acknowledge enable flip-flop 231 set so that a high level output from flip-flop 231 will be supplied to input 227 of AND gate 219 via lead 269 in FIG. 3*a*. The acknowledge enable flip-flop 231 is set by the output of delay line 369 which in turn is energized through OR gate 268 by the setting of flip-flop 284. The output pulse of delay line 369 is shown as pulse 301 occurring at time $T_9$ in waveform O of FIG. 5. The enabling of acknowledge enable flip-flop 231 by such pulse is also shown at time $T_9$ in waveform G of FIG. 5.

Thus, at time $T_9$ all the conditions necessary to enable memory request AND gate 219 have been met, as well as the conditions necessary to enable AND gate 261. More specifically, the conditions for enabling AND gate 219 are:

1. the setting of acknowledge enable flip-flop 231;
2. the setting of memory request flip-flop 230;
3. the presence of the decoded signal output from address decoder 218 of FIG. 3.

The conditions necessary to enable AND gate 261 are as follows:

1. the setting of acknowledge enable flip-flop 231;
2. the setting of flip-flop 284 in toggle switch 203;
3. the setting of memory request flip-flop 230 in FIG. 3.

Thus, at time $T_9$ the second access to main memory is effected and functions to pass the word previously staged in matrix 2 through AND gate 209, OR gate 210, and the memory drivers 211 into main memory, where such word is processed.

Since AND gate 261 was also enabled at time $T_9$ the delay line 263 produces an output signal 377 on output terminal F a short time thereafter at time $T_{10}$, as represented by waveform N of FIG. 5. The output of delay line 263 performs essentially the same three functions as did the output of delay line 262 at time $T_4$ in waveform I.

More specifically, the output of delay line 263 performs the following three functions:

1. clears acknowledge enable flip-flop 231 through OR gate 271;
2. sets the request address flip-flop 255 through OR gate 281;
3. clears the memory request flip-flop 230 through OR gate 244.

The setting of request address flip-flop 255 initiates the request for the next 74-bit word from the operand address control, as shown at time $T_{10}$ in waveform C of FIG. 5. Subsequently, at time $T_{11}$ as shown in waveform D, matrix 1 is again loaded with address representing signals preparatory to the next memory reference.

The staging of matrix 1 also functions to energize start delay line 233 (FIG. 3) to produce an output pulse which is supplied via OR gate 243 to set the memory request flip-flop 230 as shown at time $T_{13}$ in waveform F of FIG. 5. The output of start delay line 233 also functions to clear the request address matrix flip-flop 255 through OR gate 280. The address decode logic 218 responds to the received address from the CA operand control to supply the decoded address to the memory request AND gate 219. However, said AND gate 219 will not yet pass such decoded address since the acknowledge enable flip-flop 231 of FIG. 3*a* is not yet set. The setting of flip-flop 231 must wait until the acknowledge pulse is received back from the previous access of main memory, which occurred at time $T_9$ as shown in waveform H. Such acknowledgement pulse is shown in waveform J as occurring at time $T_{12}$ and identified by reference character 378.

Such acknowledgement pulse is supplied to the toggle switch 203 of FIG. 3*a* to set flip-flop 283 and clear flip-flop 284. The output of flip-flop 283 is then supplied through OR gate 268, delay line 369 and then through OR gate 270 to set acknowledge flip-flop 231 as shown at time $T_{14}$ in waveforms O and G of FIG. 5*a*.

At the same time that the memory request AND gate 219 is energized, the AND gate 260 is also energized to initiate energization of delay line 262. The output of delay line 262 occurs a short time later at time $T_{15}$ as shown by pulse 304 in waveform I of FIG. 5*a*.

The output of delay line 262 performs the three functions discussed hereinbefore; namely, the clearing of acknowledge enable flip-flop 231, the clearing of memory request flip-flop 230 and the setting of request address flip-flop 256 to condition the logic for the staging of matrix 2.

Figure 5A:
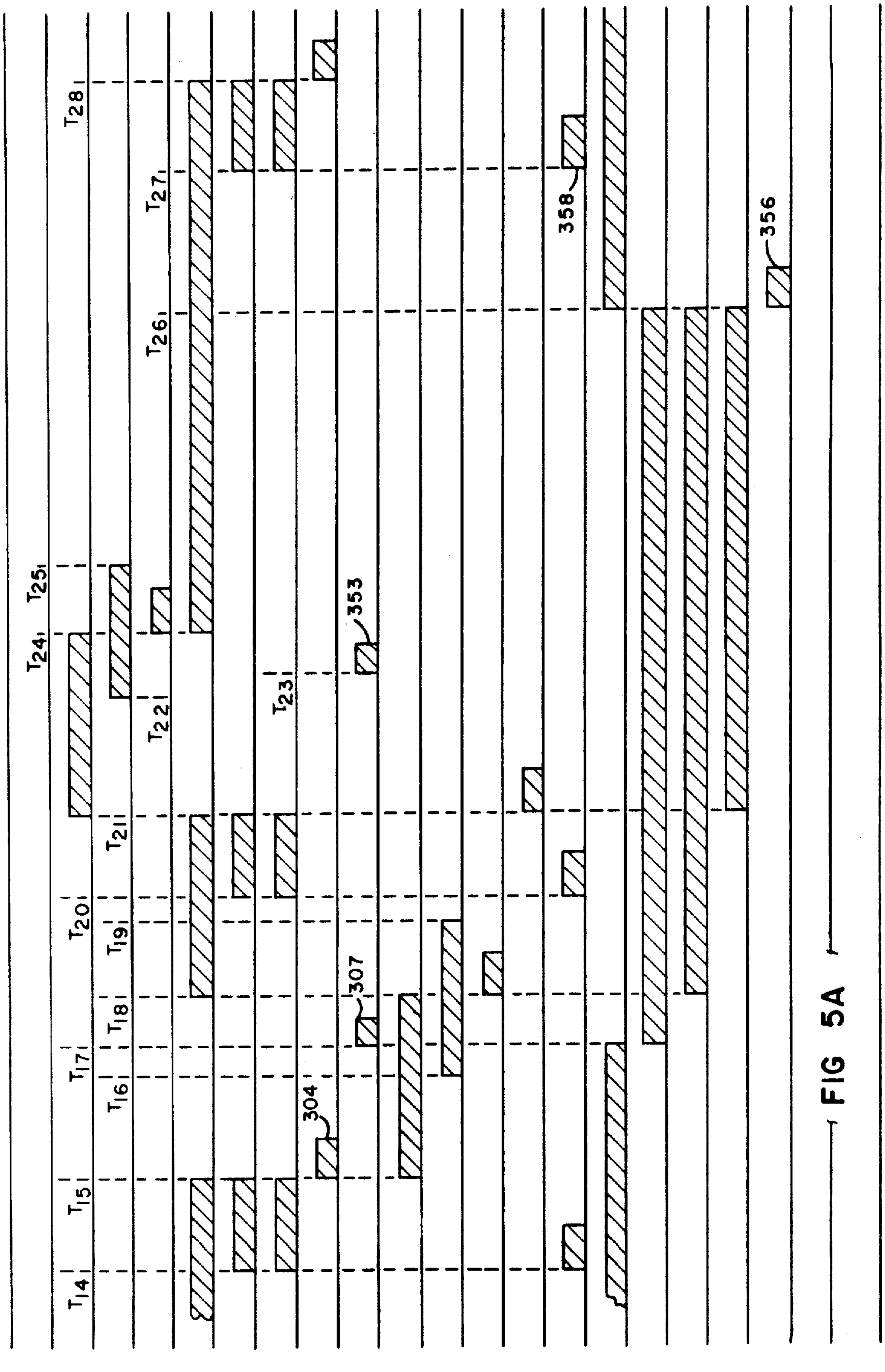

The remainder of the timing diagram of FIG. 5*a*, from time $T_{15}$ through time $T_{28}$ shows the operation of the system over an extended cycle time.

C. OPERATION OF CIRCUIT IN EXTENDED CYCLE MODE

Under certain circumstances an extended cycle time is needed. Such a need arises, for example, when a partial write, test and set, test and clear, or test and skip operation is to be made.

Figure 3B:
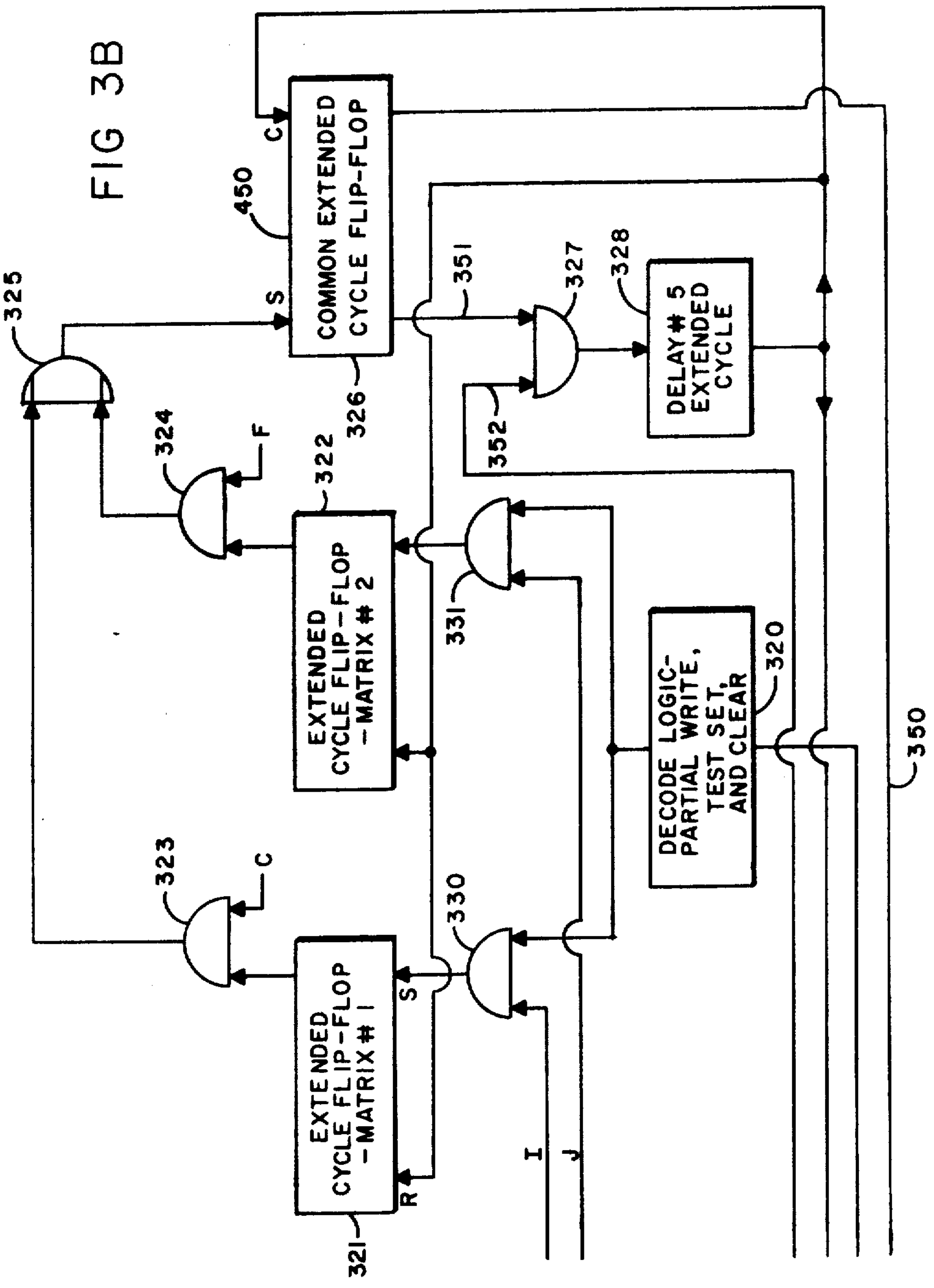

Under such conditions the decode circuit 320 of FIG. 3b functions to respond to the 74-bit received word to supply an output signal to one of the inputs of each of AND gates 330 and 331. However, only one of AND gates 330 and 331 has been conditioned to pass the output from decode logic 320. More specifically, the other inputs to AND gates 330 and 331 are the outputs of start delay lines 233 and 234 respectively of FIG. 3. Thus the AND gate, of AND gates 330 and 331, which will be enabled is determined by the particular matrix which has been staged last.

Accordingly, assume that matrix 2 of FIG. 3*a* had been staged at time $T_{16}$ as shown in FIG. 5*a*. Then the output of start delay line 234 of FIG. 3 will function to enable AND gate 331 at time $T_{18}$, and thereby set extended cycle flip-flop 322 at time $T_{18}$ as shown in waveform R.

At time $T_{18}$ an output from delay line 234 is generated as shown in waveform M which functions to set memory request flip-flop 230 of FIG. 3 as shown in waveform F, also at time $T_{18}$.

When the acknowledge pulse 307 from the previous matrix 1 cycle of operation occurred at time $T_{17}$, it had enabled matrix flip-flop 2 and disabled the matrix flip-flop 1, thereby preparing for the transfer of the data in matrix 2 through AND gate 209, OR gate 210 and into main memory when a memory access from AND gate 219 subsequently occurs.

Returning again to the effect of delay line 234 at time $T_{18}$ it can be seen that the occurrence of such pulse also functions to set the matrix 2 extended cycle flip-flop 322 in FIG. 3*b*.

As set forth above, it has been assumed that the 74-bit word supplied to matrix 2 from operand control contains a request of a type which calls for an extended cycle of operation. Accordingly, the decode logic 320 of FIG. 3*b* has supplied an output signal to one of the inputs of AND gate 331. Since the only other input to AND gate 331 is from the output of delay line 234 of FIG. 3, said AND gate 331 will set extended cycle flip-flop 322 when the output of delay line 234 occurs at time $T_{18}$.

In response to the acknowledge pulse 307 occurring at time $T_{17}$ in waveform J the toggle switch 203 of FIG. 3*a* will toggle to energize delay line 369 through OR gate 268. Delay line 369 will subsequently supply an output pulse to the input of OR gate 270 and then therethrough to set acknowledge enable flip-flop 231 at time $T_{20}$, as shown in the waveform G of FIG. 5*a*.

Since the three inputs to the memory request AND gate 219 are all high, an access to main memory from said AND gate 219 will occur at time $T_{20}$ as shown in the waveform H of FIG. 5*a*.

In the manner described hereinbefore the delay line 263 of FIG. 3*a* is also energized at time $T_{20}$ by the setting of acknowledge enable flip-flop 231. A short time later, at time $T_{21}$, an output will occur from delay line 263 as shown in waveform N, which output will function to terminate the three pulses shown in waveforms F, G and H at time $T_{21}$, and will also function to request the address from matrix 1, as shown in waveform C.

Also, at time $T_{21}$, the output of delay line 263 will function to enable AND gate 324 of FIG. 3b to set the common extended cycle flip-flop 326 as shown at time $T_{21}$ in waveform S.

The setting of common extended cycle flip-flop 326 functions to inhibit AND gates 285 and 286 in toggle 259 via lead 350 so that when the next acknowledgement pulse arrives on input lead 258 the AND gates 285 and 286 cannot be energized.

The set output 351 of extended cycle flip-flop 326 is at a high level after time $T_{21}$ in FIG. 5 and conditions AND gate 327 to pass the acknowledge pulse 353 which will be supplied to the other input lead 352 when it arrives at time $T_{23}$ in waveform J OF FIG. 5*a*.

Thus, since AND gates 287 and 288 are inhibited, the acknowledge pulse 353 cannot pass into the toggle switch 203 of FIG. 3*a* to toggle said switch, but rather is diverted through the AND gate 327 and then into time delay 328 from whence it is supplied back through OR gates 287 and 288 of FIG. 3*a* to AND gates 285 and 286, which are now enabled, as discussed below.

The output of time delay 328 is supplied via lead 354 back to the clear input of extended cycle flip-flop 326 to clear flip-flop 326 simultaneously with the supplying of the delayed signal to AND gates 285 and 286. The logic is so constructed that the flip-flop 326 will be cleared prior to the termination of the pulse supplied to AND gates 285 and 286 so that said AND gates 285 and 286 will be conditioned to pass the pulse outputted from delay line 328.

In the particular example being discussed, the toggle switch 203 will thereby be toggled so that flip-flop 283 will be set and flip-flop 384 will be cleared as shown at time $T_{26}$ in waveforms P and Q of FIG. 5*a*. In FIG. 5a the output from extended delay line 328 of FIG. 3*b* is shown as pulse 356 occurring at time $T_{26}$ in waveform T of FIG. 5*a*.

In addition to toggling the switch 203 of FIG. 3*a* the pulse 356 also functions to clear the matrix 2 extended cycle flip-flop 322 of FIG. 3*b* and also the common extended cycle flip flop 326 as shown at time $T_{26}$ in FIG. 5*a*.

The toggling of toggle switch 203 by output pulse 356 from time delay 238 in FIG. 3*b* functions to supply a pulse through OR gate 268 and into delay line 369. The output from delay line 369 is represented by pulse 358 at time $T_{27}$ in waveform O of FIG. 5*a*, and functions to initiate the access of main memory from AND gate 219 of FIG. 3. The accessing of main memory is shown as occurring at time $T_{27}$ in waveforms F, G and H of FIG. 5*a*.

It can be seen from waveform F of FIG. 5*a* that the memory request flip-flop 230 of FIG. 3 was energized from time $T_{24}$ until time $T_{28}$ while waiting for the extended cycle time of the previous memory access to be completed.

The termination of the prior extended cycle time occurs at time $T_{27}$ upon the occurrence of the output pulse 358 from delay line 369, as shown in waveform O of FIG. 5*a*.

It is to be understood that the form of the invention shown and described herein is but a preferred embodiment thereof and that various changes may be made or can be made in the logic arrangement, and in the timing, without departing from the spirit or scope of the invention.

What is claimed is:

1. In a data processor having a memory means and a source of address requests, a multiplexed memory request system constructed to temporarily store a next address request for subsequent memory access during the time interval that a current address request for memory access is being utilized in accessing said memory means comprising:

control means for requesting address requests from said source of address requests;

first and second buffer matrices for alternately storing successively received address requests from said source of address requests;

first and second gating means alternately responsive to said control means for alternately permitting the transfer of the contents of said first and second matrices to said memory means in preparation for a current memory access;

acknowledging means responsive to the receipt of the current memory access request from said source of address requests to generate an acknowledgement signal; and memory access means comprising third gating means responsive to the contents of each received address request and to the acknowledgement signal of the current memory access request to generate a memory access request and to effect the transfer of the contents of said first and second buffer matrices, in alternate sequence, to said memory means;

said control means including first delay means responsive to said acknowledgement signal for producing a delayed signal which initiates the next address request and which clears said memory access means in preparation for the storing of the next following address request in the matrix which was used to store the address request for the immediately preceding memory access.

2. A multiplexed memory request system in accordance with claim 1 in which said control means further comprises:

extended cycle logic means responsive to predetermined data in a given received address request word to delay for a predetermined time interval, the reception by said control means of the acknowledgement signal which is generated from the memory access request resulting from said given received address request, to thereby delay the initiation of the next occurring memory access request.

3. A multiplexed memory request system in accordance with claim 1 in which said first delay means comprises second and third delay means responsive respectively to the acknowledgement signal resulting from a memory access by the contents of said first or second buffer storage matrix, respectively;

said second and third delay means constructed, when energized, to initiate the loading of said second and first matrix, respectively;

said second and third delay means further responsive to successively received acknowledgement signals to become alternately energized.

4. In a data processor having a memory means and a source of memory address requests, a multiplexed memory access request system constructed to temporarily store a next address word representing a request for memory access during the time interval that a current address request for memory access is being utilized in accessing said memory means comprising:

control means for requesting address request words from said source of address requests;

first and second buffer matrices for alternately storing successively received address request words from said source of memory address requests;

first and second gating means alternately enabled by said control means to alternately permit the transfer of the contents of said first and second matrices to said memory means in preparation for a memory access;

acknowledging means responsive to the receipt by said memory means of the current memory access request to generate an acknowledgement signal;

memory access means having a third gating means responsive to the signals comprising the current address request and to the acknowledgement signal of the immediately prior memory access to access said memory and thereby pass the contents of the matrix, whose contents are being gated therefrom, into said memory means;

said control means responsive to said acknowledgement signal to alternately and sequentially enable said first and second gating means to alternately supply the address requests stored in said matrices to said memory;

said control means further comprising first delay means responsive to said acknowledgement signal to produce a control signal after a predetermined time interval to initiate the next address request and to clear said memory access means in preparation for the receipt of a next memory access word.

5. A multiplexed memory request system in accordance with claim 4 in which said control means further comprises:

extended cycle logic means responsive to predetermined data in a given received address request word to delay, for a predetermined time interval, the reception by said control means of the acknowledgement signal which is generated from the memory access request resulting from said given received address request, to thereby delay the initiation of the next occurring memory access request.

6. A multiplexed memory request system in accordance with claim 4 in which said first delay means comprises second and third delay means responsive respectively to the acknowledgement signal resulting from a memory access by the contents of said first or second matrix, respectively;

said second and third delay means constructed, when energized, to initiate the loading of said second and first matrix, respectively;

said second and first delay means further responsive to successively received acknowledgement signals to become alternately energized.

7. In a data processor having a memory means and a source of address request words, a method for staging a given address request for memory access during the time interval that an immediately preceding address request is being utilized comprising the steps of:

requesting a given address request word from said source of address requests;

temporarily storing said given address request in a first of two buffer matrices;

generating an acknowledgement signal when the immediately preceding memory access is effected;

accessing said memory means by first gating the address request stored in said first matrix into said memory; and subsequently clearing said first matrix after a given memory access has occurred and utilizing the contents of the other of said matrices to access the memory on the next succeeding memory access cycle.

8. A method in accordance with claim 7 comprising the further steps of:

testing each received address request for data indicating an extended cycle is needed;

delaying the acknowledgement signal resulting from accessing said each received address request to memory to delay the accessing to memory of the next occurring address request.

* * * * *